United States Patent
Welch et al.

(10) Patent No.: US 11,566,298 B2
(45) Date of Patent: Jan. 31, 2023

(54) SYSTEMS AND METHODS FOR MANUFACTURING COMPONENTS FOR GAS TURBINE ENGINES

(71) Applicant: United Technologies Corporation, Farmington, CT (US)

(72) Inventors: Derek T. Welch, Marlborough, CT (US); Nikhil Mehta, Berlin, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 724 days.

(21) Appl. No.: 16/406,129

(22) Filed: May 8, 2019

(65) Prior Publication Data
US 2020/0354804 A1    Nov. 12, 2020

(51) Int. Cl.
*C21D 7/06* (2006.01)
*C21D 9/00* (2006.01)
*B24C 1/10* (2006.01)

(52) U.S. Cl.
CPC .............. *C21D 9/0068* (2013.01); *B24C 1/10* (2013.01); *C21D 7/06* (2013.01); *C21D 2221/00* (2013.01)

(58) Field of Classification Search
CPC .............. B24C 1/10; C21D 7/06; B21D 31/06
See application file for complete search history.

(56) References Cited

U.S. PATENT DOCUMENTS

| 4,530,861 A | * | 7/1985 | Sippel | B24C 1/086 451/457 |
| 6,189,356 B1 | * | 2/2001 | Simeone | B24C 1/10 29/90.7 |
| 7,066,799 B2 | * | 6/2006 | Oussaada | C23C 4/01 451/439 |

(Continued)

FOREIGN PATENT DOCUMENTS

| GB | 1188016 A | 4/1970 |
| WO | 2008104155 A1 | 9/2008 |

OTHER PUBLICATIONS

European Search Report for European Application No. 20173567.7, International Filing Date May 7, 2020, dated Aug. 10, 2020, 6 pages.

(Continued)

*Primary Examiner* — Edward T Tolan
(74) *Attorney, Agent, or Firm* — Cantor Colburn LLP

(57) ABSTRACT

Methods and masks for manufacturing component of gas turbine engines are described. The methods include applying a mask to a protected surface of the component, the component having a designated surface to be treated by a shot peen operation. The mask includes a full masking portion configured to prevent a shot peen media from impacting the protected surface. A masking control region is arranged around the designated surface. The masking control region is configured to control an amount of force imparted to the component by shot peen media during the shot peen operation, wherein the masking control region extends from the (Continued)

full masking portion to the designated surface. The designated surface is shot peened with shot peen media to form a compressive stress region within the component proximate the designated surface and a tapering transition of compressive forces within the component proximate the masking control region.

13 Claims, 6 Drawing Sheets

(56) References Cited

U.S. PATENT DOCUMENTS

| | | | | |
|---|---|---|---|---|
| 7,922,453 | B2* | 4/2011 | Bozdogan | F01D 25/285 |
| | | | | 416/193 A |
| 8,308,626 | B2* | 11/2012 | Klintenstedt | B04B 7/14 |
| | | | | 494/68 |
| 9,057,272 | B2* | 6/2015 | Cheah | B24B 31/06 |
| 10,913,138 | B2* | 2/2021 | Strzyzewski | F01D 5/005 |
| 2002/0042978 | A1* | 4/2002 | Cheppe | B24B 39/006 |
| | | | | 29/889 |
| 2003/0034122 | A1* | 2/2003 | Asai | C04B 41/91 |
| | | | | 156/252 |
| 2005/0100672 | A1* | 5/2005 | Stankowski | F01D 5/00 |
| | | | | 427/595 |
| 2007/0107807 | A1* | 5/2007 | Vigneau | B23P 9/00 |
| | | | | 148/320 |
| 2009/0173418 | A1 | 7/2009 | Jayabalan | |
| 2014/0003952 | A1 | 1/2014 | Cheah | |
| 2015/0118444 | A1 | 4/2015 | Lipkin et al. | |
| 2019/0039208 | A1 | 2/2019 | Hida et al. | |
| 2020/0208233 | A1* | 7/2020 | Hackel | C23C 8/24 |

OTHER PUBLICATIONS

European Office Action for European Application No. 20173567.7; dated Nov. 3, 2022; 6 pages.

* cited by examiner

SYSTEMS AND METHODS FOR MANUFACTURING COMPONENTS FOR GAS TURBINE ENGINES

BACKGROUND

Illustrative embodiments pertain to the art of turbomachinery, and specifically to turbine rotor components.

Gas turbine engines are rotary-type combustion turbine engines built around a power core made up of a compressor, combustor and turbine, arranged in flow series with an upstream inlet and downstream exhaust. The compressor compresses air from the inlet, which is mixed with fuel in the combustor and ignited to generate hot combustion gas. The turbine extracts energy from the expanding combustion gas, and drives the compressor via a common shaft. Energy is delivered in the form of rotational energy in the shaft, reactive thrust from the exhaust, or both.

The components of gas turbine engines may be manufactured using a number of different techniques, as appreciated by those of skill in the art. For example, shot peening is a manufacturing process used to induce compressive stress in specified surface layers of metallic parts. The shot peen process may be employed, for example, for increasing fatigue strength of a given part or portion of a part. However, certain areas of metallic parts are not allowed to be shot peened, due to negative impacts thereto. Such limitation has resulted in the use of protective masks. However, improvements to such protective masks and the use of shot peening may be desirable.

BRIEF DESCRIPTION

According to some embodiments, methods for manufacturing components of gas turbine engines are provided. The method includes applying a mask to a surface of the component, the component having a designated surface to be treated by a shot peen operation, wherein the mask is applied to a protected surface of the component, the mask comprising a full masking portion configured to prevent a shot peen media from impacting the protected surface beneath the full masking portion, arranging a masking control region of the mask around the designated surface, wherein the masking control region is configured to control an amount of force imparted to the component by shot peen media during the shot peen operation, wherein the masking control region extends from the full masking portion to the designated surface, and shot peening the designated surface with the shot peen media to form a compressive stress region within the component proximate the designated surface and a tapering transition of compressive forces within the component proximate the masking control region.

In addition to one or more of the features described herein, or as an alternative, further embodiments of the methods may include that the masking control region comprises a tapering portion extending from the full masking portion to the designated surface.

In addition to one or more of the features described herein, or as an alternative, further embodiments of the methods may include that the material of the masking control region is the same as the material of the full masking portion.

In addition to one or more of the features described herein, or as an alternative, further embodiments of the methods may include that the material of the masking control region is the different from the material of the full masking portion.

In addition to one or more of the features described herein, or as an alternative, further embodiments of the methods may include that the masking control region comprises a modified material portion extending from the full masking portion to the designated surface.

In addition to one or more of the features described herein, or as an alternative, further embodiments of the methods may include that the modified material portion comprises at least one of a different material and a different material property than the full masking portion.

In addition to one or more of the features described herein, or as an alternative, further embodiments of the methods may include that the masking control region comprises a composite portion extending from the full masking portion to the designated surface.

In addition to one or more of the features described herein, or as an alternative, further embodiments of the methods may include that the composite portion comprises at least one of a different material and a different material property than the full masking portion.

In addition to one or more of the features described herein, or as an alternative, further embodiments of the methods may include that the composite portion comprises a plurality of layers of material.

In addition to one or more of the features described herein, or as an alternative, further embodiments of the methods may include that each layer of the plurality of layers of material is formed of a different material.

In addition to one or more of the features described herein, or as an alternative, further embodiments of the methods may include that the masking control region is formed from at least one of plastic backed masking tape, rubber backed masking tape, vinyl backed masking tape, selective layer sintering additive manufacturing material glass filled nylon, polymer additive manufacturing material, silicone rubber molded materials, room temperature vulcanization material, metal, and metal alloy.

In addition to one or more of the features described herein, or as an alternative, further embodiments of the methods may include that the component is an airfoil.

In addition to one or more of the features described herein, or as an alternative, further embodiments of the methods may include that the masking control region is less than 1.25 inches in a length from the full masking portion to the designated surface.

According to some embodiments, masks for use in manufacturing components of gas turbine engines are provided. The masks include a full masking portion configured to prevent a shot peen media from impacting a protected surface beneath the full masking portion when the mask is applied to a component and a masking control region configured to be arranged around a designated surface of the component to be treated by a shot peen operation, wherein the masking control region is configured to control an amount of force imparted to the component by shot peen media during the shot peen operation, wherein the masking control region is configured to extend from the full masking portion to the designated surface when applied to the component.

In addition to one or more of the features described herein, or as an alternative, further embodiments of the masks may include that the masking control region comprises a tapering portion extending from the full masking portion to the designated surface when applied to the component.

In addition to one or more of the features described herein, or as an alternative, further embodiments of the masks may include that the masking control region comprises a modified material portion extending from the full masking portion to the designated surface.

In addition to one or more of the features described herein, or as an alternative, further embodiments of the masks may include that the masking control region comprises a composite portion extending from the full masking portion to the designated surface.

In addition to one or more of the features described herein, or as an alternative, further embodiments of the masks may include that the composite portion comprises a plurality of layers of material.

In addition to one or more of the features described herein, or as an alternative, further embodiments of the masks may include that each layer of the plurality of layers of material is formed of a different material.

In addition to one or more of the features described herein, or as an alternative, further embodiments of the masks may include that the masking control region is formed from at least one of plastic backed masking tape, rubber backed masking tape, vinyl backed masking tape, selective layer sintering additive manufacturing material glass filled nylon, polymer additive manufacturing material, silicone rubber molded materials, room temperature vulcanization material, metal, and metal alloy.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike: The subject matter is particularly pointed out and distinctly claimed at the conclusion of the specification. The foregoing and other features, and advantages of the present disclosure are apparent from the following detailed description taken in conjunction with the accompanying drawings in which like elements may be numbered alike and:

DETAILED DESCRIPTION

Detailed descriptions of one or more embodiments of the disclosed apparatus and/or methods are presented herein by way of exemplification and not limitation with reference to the Figures.

Figure 1:
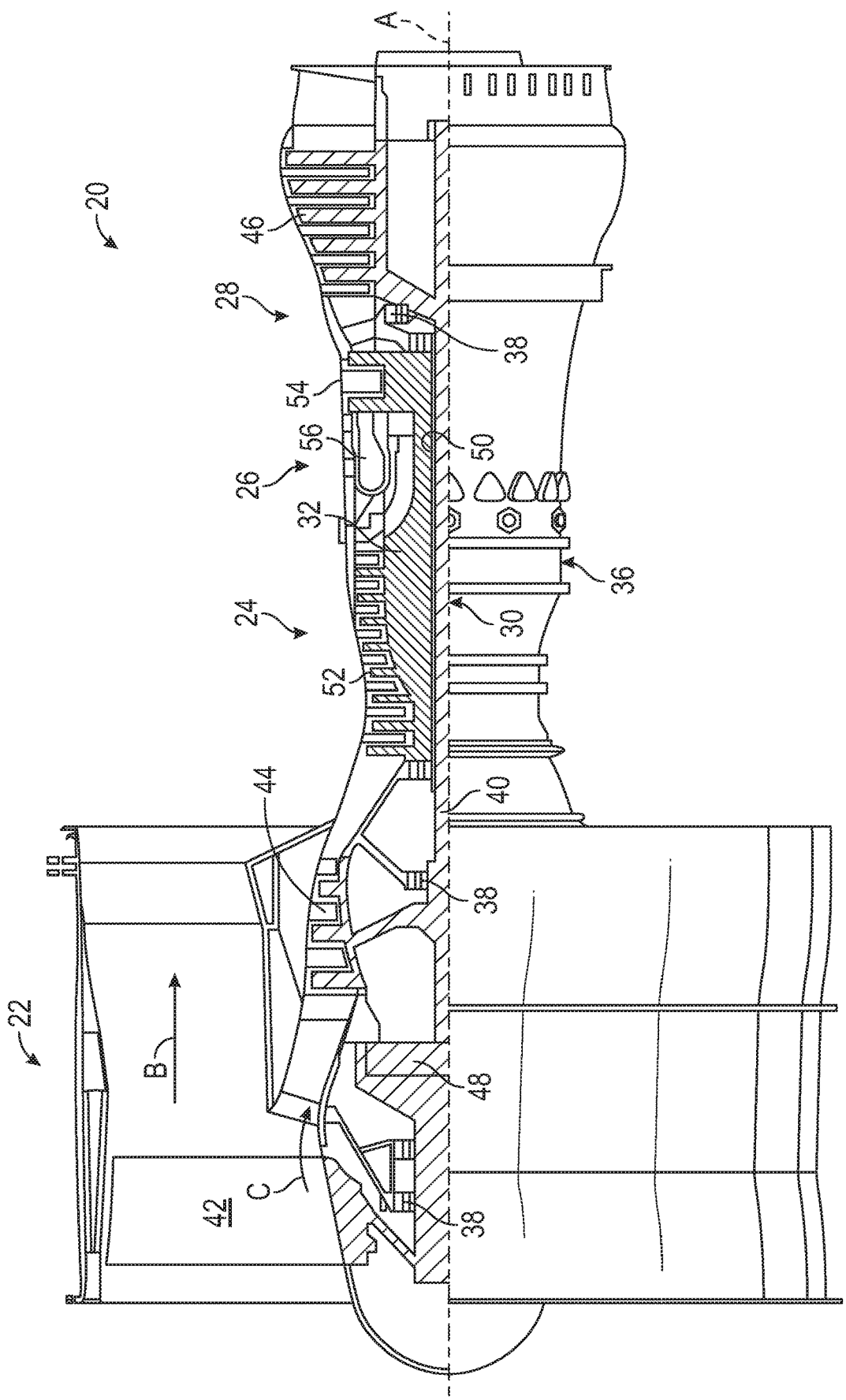
FIG. 1 is a schematic cross-sectional illustration of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one non-limiting example is a high-bypass geared aircraft engine. In a further non-limiting example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition--typically cruise at about 0.8 Mach and about 35,000 feet (10,688 meters). The flight condition of 0.8 Mach and 35,000 ft (10,688 meters), with the engine at its best fuel consumption--also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(514.7\ °R)]^{0.5}$. The "Low corrected fan tip speed" as disclosed herein according to one non-limiting embodiment is less than about 1150 ft/second (350.5 m/sec).

Although the gas turbine engine 20 is depicted as a turbofan, it should be understood that the concepts described herein are not limited to use with the described configuration, as the teachings may be applied to other types of engines or any component that requires shot peening to enhance fatigue life such as, but not limited to, turbojets, turboshafts, etc.

As discussed above, shot peening is a cold working manufacturing process used to induce compressive stress in specified surface layers of metallic parts. The shot peen process may be employed, for example, for increasing fatigue strength of a given part or portion of a part. However, certain areas of metallic parts are not allowed to be shot peened, due to negative impacts thereto. Such limitation has resulted in the use of protective masks. However, improvements to such protective masks and the use of shot peening may be desirable. It has been determined that an issue may arise where a sharp lines of demarcation forms at the masked/non-masked interface on a part that is shot peened. The rapid change of compressive stress levels at the line of demarcation may cause structural issues and potential part failure. Accordingly, embodiments described herein are directed to improved processes for shot peening components and treating surfaces/materials with a shot peen process.

In a shot peen process, shot or other media is fired from an orifice and impinged upon or otherwise directed to impact a surface of a part to create a surface layer of compressive stresses. The region that is impacted by the shot may have a spread or impact area as the shot expands as it exits the orifice and approaches the surfaces. Thus, the region that is impacted is large in surface area than the orifice size, because the particles of shot will expand, typically in a conical manner.

However, certain areas of metallic parts are not allowed to be shot peened. For example, a polished surface may not be desirable to be shot peened (or even proximate a shot peen operation) because the shot peen media may lower the surface finish resulting from surface dimples created during shot peening. A typical way to prevent direct shot peening is to mask the surface that is desired to not be shot peened. For example, an adhesive tape or covering may be applied to the area. An example of a covering may be a metal sheet or mask that is overlaid on the surface to be protected from shot peen media impacts. These masking techniques are configured to absorb or reflect the shot peen media energy, thereby protecting the part surface.

It has been observed that an issue arises where sharp lines of demarcation form at the masked/non-masked interface. The sharp line at the masked/non-masked interface causes a rapid change of compressive stress levels.

Figure 2:
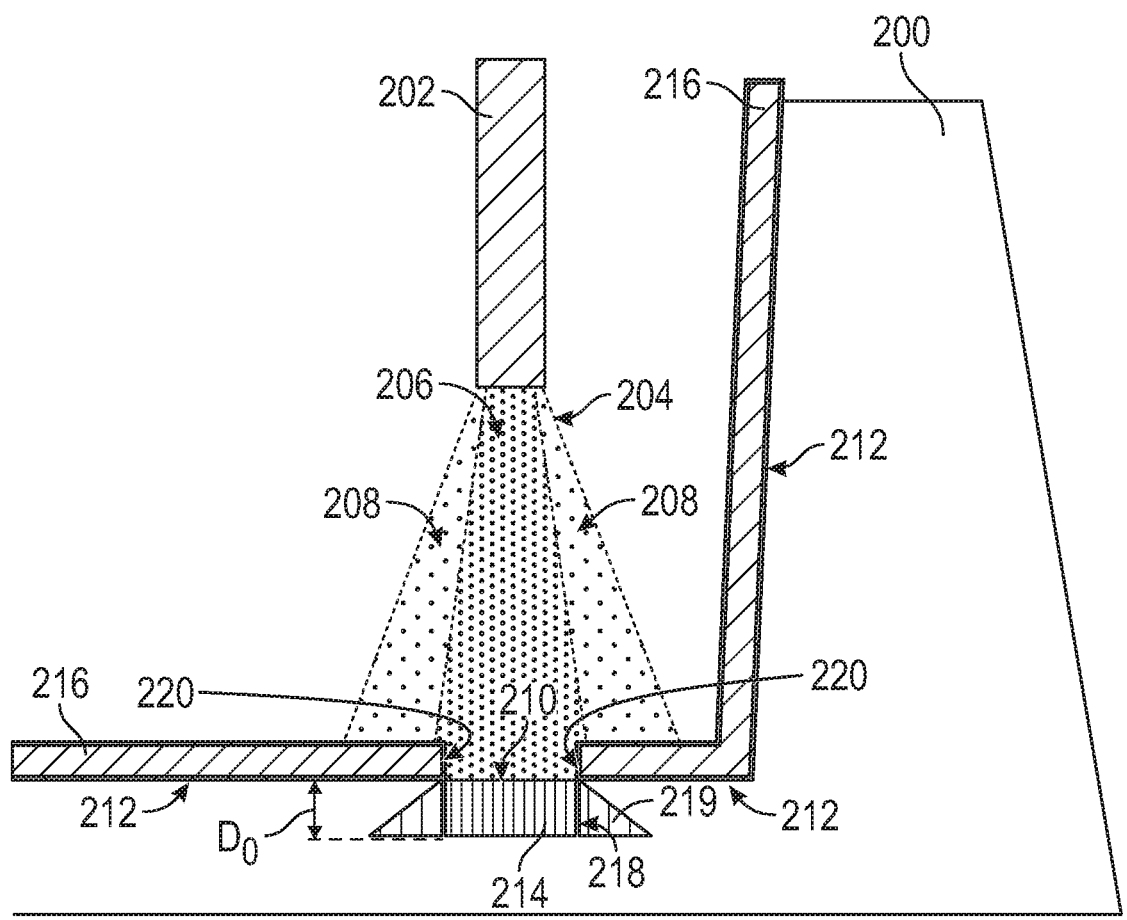
FIG. 2 is a schematic illustration of a shot peen operation for treating a surface of a component.

For example, turning to FIG. 2, a schematic illustration of a portion of a shot peening process is shown. In FIG. 2, a component 200 is illustratively shown being shot peened. A shot peen tool 202 (e.g., nozzle) is arranged to direct shot peen media 204 toward the component 200. The shot peen media 204 spreads out as it exits the shot peen tool 202, and thus a primary or full intensity shot peen stream 206 and an overspray shot peen stream 208 are formed. The full intensity shot peen stream 206 is directed to impinge upon or impact a designated surface 210 of the component 200. The component 200 also includes protected surfaces 212 which are parts of the component 200 around the designated surface 210 but it is not desirable to shot peen. For example, the protected surfaces 212 may be finished surfaces and the designated surface 210 may be a surface requiring additional strength. For example, a compressive stress region 214 may be formed in the component 200 beneath the designated surface 210. The compressive stress region 214 has a depth $D_0$.

As shown, the overspray shot peen stream 208 may be wide enough to potentially impact the protected surfaces 212. To protect the protected surfaces 212, a mask 216 may be applied to the protected surfaces 212. The mask 216 may be formed of any suitable material, such as an adhesive tape or metal sheet. The selection of the material and arrangement of the mask 216 may be selected based on the specific properties of the shot media selected for the shot peening operation. The mask 216 may be arranged to absorb the impact energy of the overspray shot peen stream 208 or reflect the shot peen media of the overspray shot peen stream 208. Accordingly, the mask 216 is arranged to prevent impacts of the shot peen media in the overspray shot peen stream 208 to impact and effect the protected surfaces 212. Because the mask 216 protects the protected surface 212 and allows impacts to the designated surface 210, lines of demarcation 218 may be formed at a masking interface 220 where sub-surface stress components transition from the compressive stress region 214 to a tensile stress region 219. The masking interface 220 is the end of the mask 216 and defines the edges of the region of the component 200 that will be impacted by the shot peen media. The lines of demarcation 218 illustratively depict sharp changes in the sub-surface compressive forces (compressive stress region 214) to tensile stresses (tensile stress region 219) within the material of the component 200 at the edges of the compressive stress region 214.

The lines of demarcation 218 may cause structural issues and potential part failure due to the changes in stresses within the material of the component 200. In order to prevent the lines of demarcation 218 from forming, the masking interface 220 must be placed sufficiently far away from the full intensity shot peen stream 206. However, by doing so, the overspray shot peen stream 208 will impact the surfaces of the component 200 and cause the surface impact force to gradually fade out.

Figure 3:
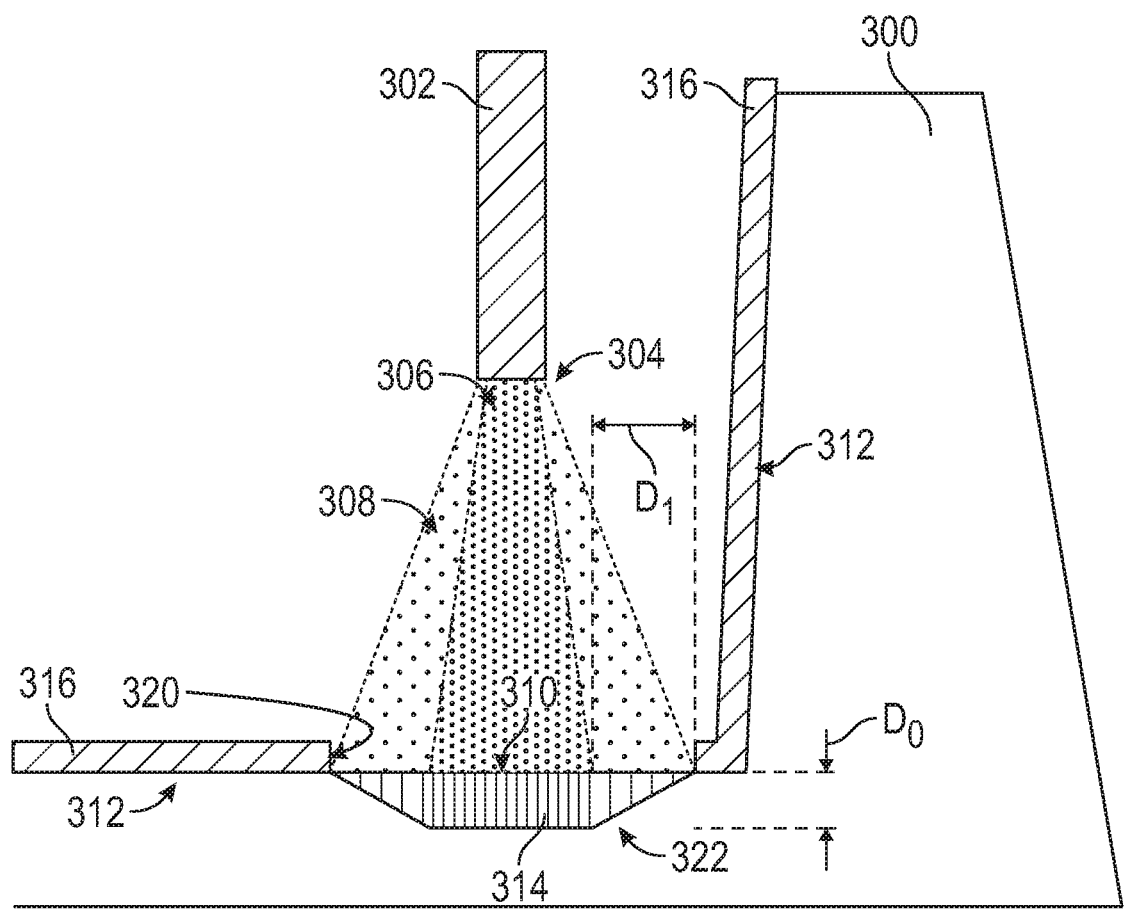
FIG. 3 is a schematic illustration of a shot peen operation for treating a surface of a component.

For example, turning to FIG. 3, an example illustration of a gradual fade of a shot peened surface is shown. In FIG. 3, a schematic illustration of a portion of a shot peening process is shown, similar to that shown in FIG. 2. A component 300 is illustratively shown being shot peened. A shot peen tool 302 (e.g., nozzle) is arranged to direct shot peen media 304 toward the component 300. The shot peen media 304 spreads out as it exits the shot peen tool 302, and thus a full intensity shot peen stream 306 and an overspray shot peen stream 308 are formed. The full intensity shot peen stream 306 is directed to impinge upon or impact a designated surface 310 of the component 300. The component 300 also includes protected surfaces 312 which are parts of the component 300 around the designated surface 310 but it is not desirable to shot peen. A compressive stress region 314 may be formed in the component 300 beneath the designated surface 310. The compressive stress region 314 has a depth $D_0$.

In this embodiment, a mask 316 defines a masking interface 320 positioned an offset distance $D_1$ from the designated surface 310 and thus from the full intensity shot peen stream 306. For example, in one non-limiting example, the offset distance $D_1$ may be at least 1.25 inches from the designated surface 310. The offset distance $D_1$ enables the overspray shot peen stream 308 to impact the material of the component 300. This relatively large distance (offset distance $D_1$) is due to a lack of accurate control of the shot peen tool 302, which results in the generation of the overspray shot peen stream 308. The impacts of the overspray shot peen stream 308 cause a tapering transition 322 of the compressive stress region 314 from the designated surface 310 to the masking interface 320. This process may be acceptable for some applications, with the overspray shot peen stream impacting the component. However, in other applications, such impact may be undesirable.

For example, the process shown in FIG. 3 may not be employed for relatively small areas which do not have the needed area/space to enable the offset distance $D_1$. For example, in the above example, a part may not have 1.25 inches of space available for fade out of the shot peening. Unfortunately, these relatively small areas with strict requirements are common in aerospace designs.

In view of this, embodiments of the present disclosure are directed to improved methods of manufacturing components that address the above limitation and provide other advantages and benefits over prior processes. Below are described various arrangements for performing a method of manufacturing a component to have improved compressive stress properties while reducing the risk of damage or impact to other parts of the component. In embodiments described below, a mask is applied to a surface of a component around a designated surface to be treated by shot peening. The mask provides protection to surfaces and material of the component during a shot peening operation. Furthermore, advantageously, embodiments described below can improve stress profiles of components by enabling control of a taping of compressive forces that are generated during a shot peening operation. The below described operations and mask may be used for the manufacture of airfoils, platforms, blade outer air seals, panels, seals, etc. that may be part of a gas turbine engine.

Figure 4:
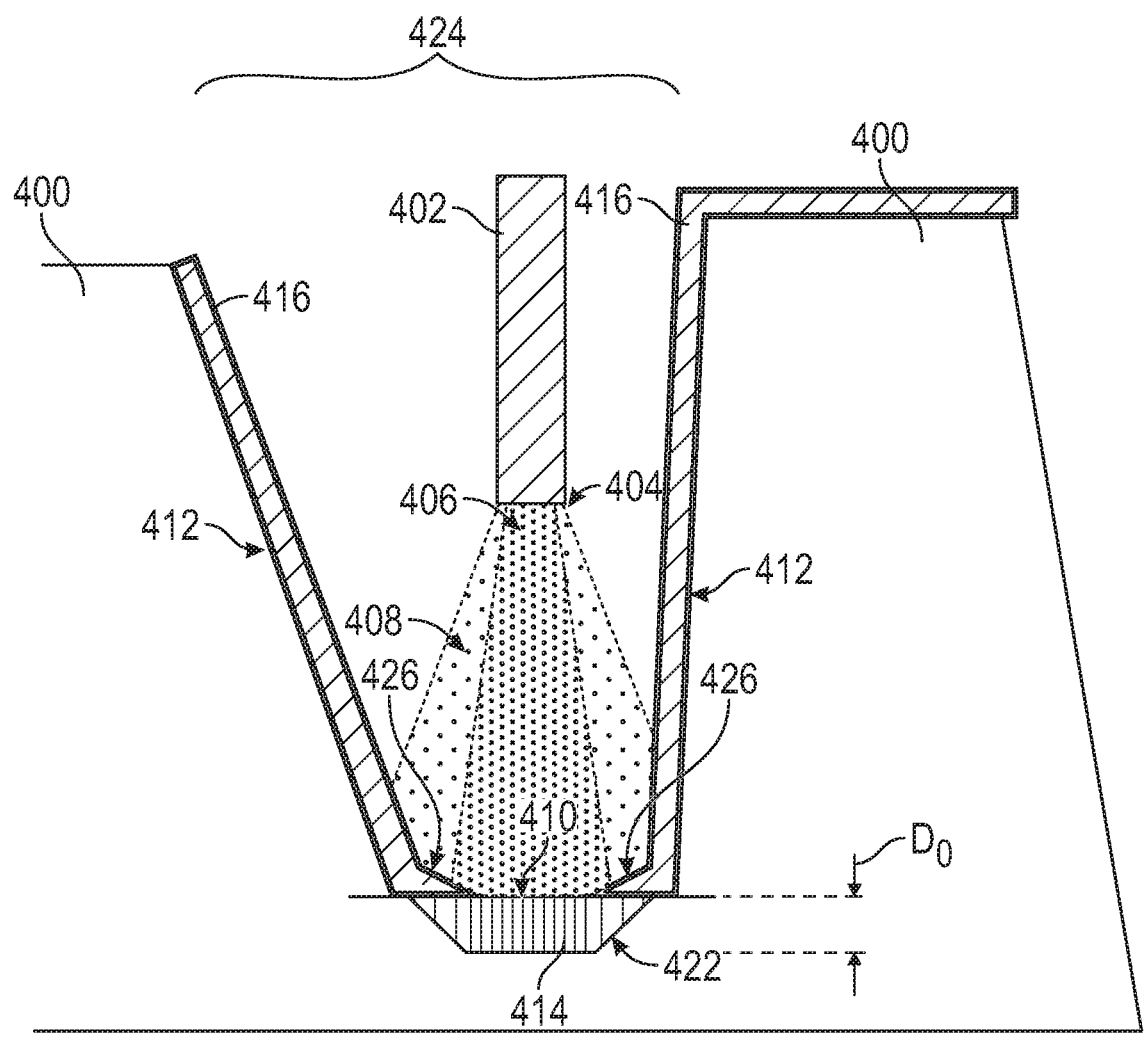
FIG. 4 is a schematic illustration of a shot peen operation for treating a surface of a component in accordance with an embodiment of the present disclosure.

Turning now to FIG. 4, a schematic illustration an example illustration of a gradual fade of a shot peened surface in accordance with an embodiment of the present disclosure is shown. In FIG. 4, a schematic illustration of a portion of a shot peening process is shown, similar to that shown in FIGS. 2-3. A component 400 is illustratively shown being shot peened, with the component 400 having a region 424 that defines a small area with a designated surface 410 to be shot peened, and very close protected surfaces 412. Because of the geometry and closeness of the protected surfaces 412 to the designated surface 410, the traditional type of shot peening and avoidance of the lines of demarcation that cause sharp changes in the compressive forces cannot be employed (i.e., no offset distance can be employed).

A shot peen tool 402 will direct shot peen media 404 toward the component 400, and ideally impinge or impact the designated surface 410. However, the shot peen media 404 will spread out as it exits the shot peen tool 402, forming a full intensity shot peen stream 406 (directed at the designated surface 410) and an overspray shot peen stream 408 (which may impact protected surfaces 412). The full intensity shot peen stream 406 is directed to impinge upon or impact the designated surface 410 of the component 400. The component 400 also includes the protected surfaces 412 which are parts of the component 400 around the designated surface 410 but it is not desirable to shot peen. A compressive stress region 414 may be formed in the component 400 beneath the designated surface 410. The compressive stress region 414 has a depth $D_0$.

In this embodiment, a mask 416 having a masking control region 426. The masking control region 426 is arranged to enable control of an amount of impact the shot peen media 404 will have upon surfaces of the component 400 around a designated surface 410. The masking control region 426 comprises a portion of the mask 416 and may be formed from the same or different material as the rest of the mask 416. In the illustrative embodiment of FIG. 4, the masking control region 426 has the same composition as the rest of the mask 416, but includes a tapering geometry where the material of the mask 416 thins out as it approaches the designated surface 410. The tapering geometry at the masking control region 426 will cause a tapering transition 422 of the compressive stress region 414, thus avoiding the generation or formation of lines of demarcation in the surfaces stresses within the material of the component 400 at the edges of the compressive stress region 414.

The masking control region 426 may define a masking interface that is not defined as starkly as prior arrangements and may not include an offset distance from the designated surface 410. The masking control region 426 can be arranged to receive impacts of shot peen media 404 from one or both of the full intensity shot peen stream 406 (directed at the designated surface 410) and the overspray shot peen stream 408. The masking control region 426 enables the overspray shot peen stream 408 to impact the material of the component 400 and can control the formation of the tapering transition 422 of the compressive stress region 414.

Embodiments of the present disclosure, such as shown in FIG. 4, are directed to masking methods which can control the impact force of a shot peen process across a defined distance. Such control can include gradual transitioning (e.g., fade out) of the shot peen intensity. This transitioning, provided by the masking control region as described herein, can reduce or eliminate a sharp line demarcation in the compressive forces within the material of the component at the edges of the compressive stress region. The mask, as provided for in embodiments of the present disclosure, can include various mechanisms or properties for enabling the gradual transition of the compressive forces in a component from a designated surface to a protected surface, the forming a tapering transition of the compressive stresses induced by the shot peen process.

In accordance with some embodiments, such as shown in FIG. 4, the tapering transition of the compressive stresses can be achieved using a tapering region of the mask itself. In other embodiments, alternatively or in combination, the mask can be formed from two or more materials or material properties such that the tapering transition of the compressive stresses is achieved as a result of the amount of absorption or reflection of the impacting force of the shot peen media. The material density, thickness, and/or mechanical properties of the materials that is used to form the mask can be selected or changed over a defined distance to gradually absorb the force of the impacts from the shot peen media. The gradual shot peen energy absorption would fade out the shot peen intensity on the part over a defined distance, therefore eliminating a sharp line of demarcation.

Figure 5:
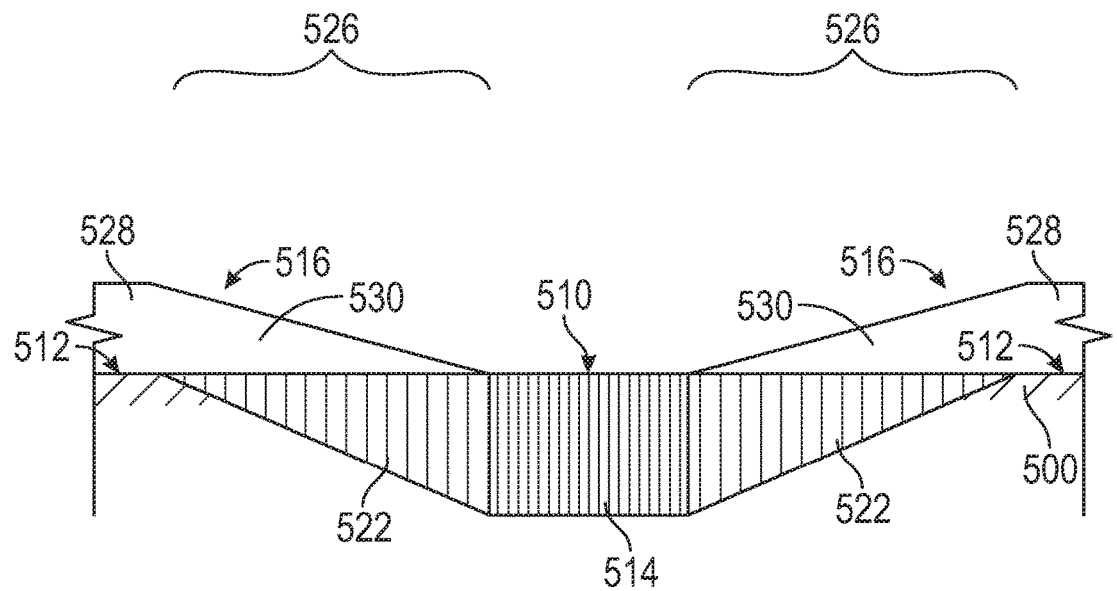
FIG. 5 is a schematic illustration of a mask in accordance with an embodiment of the present disclosure as applied to a component.

For example, turning to FIG. 5, a schematic illustration of a component 500 having a mask 516 applied thereto in accordance with an embodiment of the present disclosure is shown. The component 500 has a designated surface 510 to which it is desired to have improved compressive stresses to increase part life. To achieve such increased compressive stresses, as described above, a shot peening operation may be performed wherein a stream of shot peen media are impinged upon the designated surface 510. However, surrounding the designated surface 510 may be surfaces of the component 500 that are desired to not be impinged upon by the shot peen media. Accordingly, the mask 516 is applied to the surfaces of the component 500, and particularly to protected surfaces 512 of the component 500.

To prevent sharp lines of demarcation in the compressive stresses formed in the component 500, the mask 516 includes a masking control region 526. The masking control region 526 is configured to enable the generation of a tapering transition 522 of the compressive forces that are formed in the component 500 by the shot peen media around a compressive stress region 514 defined at the designated surface 510. The masking control region 526 covers a portion of the protected surface 512 of the component 500 from a full masking portion 528 of the mask 516 and extends to the designated surface 510. The full masking portion 528 of the mask 516 may be configured to fully protect the protected surface 512 such that no impact forces of shot peen media are transferred into the material of the component 500. In this embodiment, the masking control region 526 is defined by a tapering portion 530 of the material of the mask 516. Because of the change in thickness of the material of the mask 516 through the tapering portion 530 at the masking control region 526, the amount of force imparted into the material of the component 500 can be controlled to generate the tapering transition 522 of the compressive forces. In this embodiment, the material of the mask 516 may be the same within the full masking portion 528 and within the tapering portion 530 of the masking control region 526. The designated surface 510 may be fully exposed and unprotected such that the shot peen media may generate a compressive stress region 514 to a desired depth, as described above.

Figure 6:
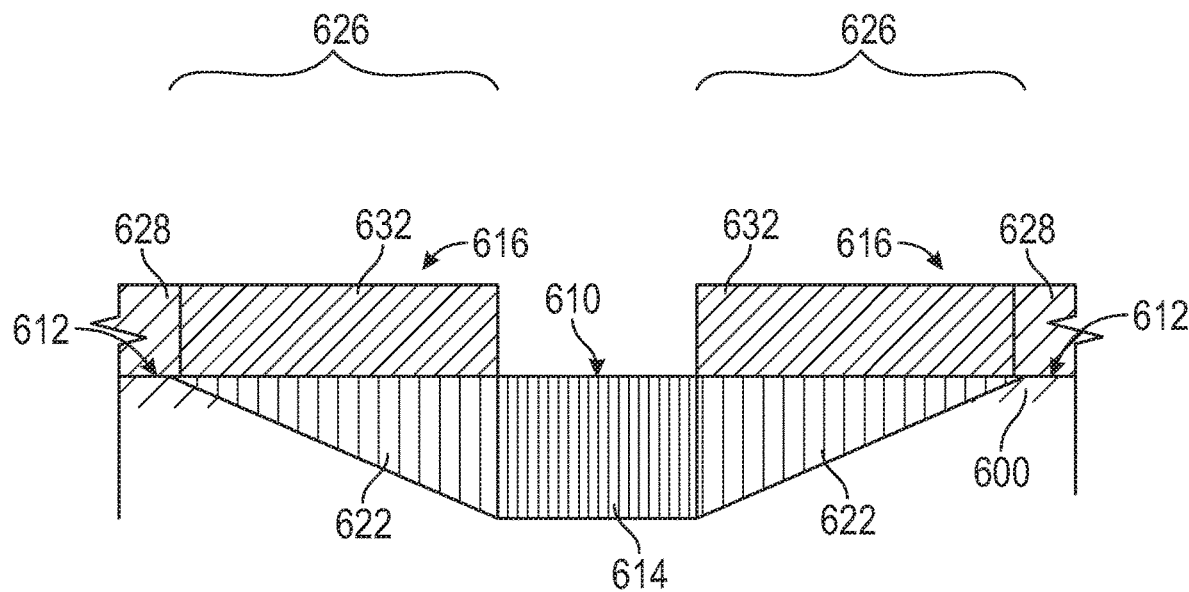
FIG. 6 is a schematic illustration of a mask in accordance with an embodiment of the present disclosure as applied to a component.

Turning now to FIG. 6, a schematic illustration of a component 600 having a mask 616 applied thereto in accordance with an embodiment of the present disclosure is shown. The component 600 has a designated surface 610 to which it is desired to have improved compressive stresses to increase part life. To achieve such increased compressive stresses, as described above, a shot peening operation may be performed wherein a stream of shot peen media are impinged upon the designated surface 610. However, surrounding the designated surface 610 may be surfaces of the component 600 that are desired to not be impinged upon by the shot peen media. Accordingly, the mask 616 is applied to the surfaces of the component 600, and particularly to protected surfaces 612 of the component 600.

To prevent sharp lines of demarcation in the compressive stresses formed in the component 600, the mask 616 includes a masking control region 626. The masking control region 626 is configured to enable the generation of a tapering transition 622 of the compressive forces that are formed in the component 600 by the shot peen media around a compressive stress region 614 defined at the designated surface 610. The masking control region 626 covers a portion of the protected surface 612 of the component 600 from a full masking portion 628 of the mask 616 and extends to the designated surface 610. The full masking portion 628 of the mask 616 may be configured to fully protect the protected surface 612 such that no impact forces of shot peen media are transferred into the material of the component 600. In this embodiment, the masking control region 626 is defined by a modified material portion 632. The modified material portion 632 of the mask 616 is formed of a material having different properties or characteristics than the material forming the full masking portion 628 of the mask 616. The material properties of the modified material portion 632 may be selected to provide a modified protection to the protected surface 612 that is different from that of the full masking portion 628. For example, the modified material portion 632 may allow for a portion of the force of impact from shot peen media to pass through the modified material portion 632 and impact and alter the properties of the material of the component 600 to generate a tapering transition 622 of the compressive forces of the material of the component 600.

Because of the change in material of the mask 616 through the modified material portion 632 at the masking control region 626, the amount of force imparted into the material of the component 600 can be controlled to generate the tapering transition 622 of the compressive forces. The designated surface 610 may be fully exposed and unprotected such that the shot peen media may generate the compressive stress region 614 to a desired depth, as described above, while the tapering transition 622 of the compressive forces can enable elimination of a sharp line of demarcation in the compressive stresses around the compressive stress region 614.

Although illustratively shown in FIG. 6 with the modified material portion 632 having a substantially uniform thickness, and represented as a single material/material property, such illustration is not to be limiting. In some embodiments, such as shown in FIG. 6, due to the reduction in forces of the overspray shot peen stream as the distance from the full intensity shot peen stream increases, a uniform thickness and uniform material property modified material portion may be employed. However, in some embodiments, the thickness of the modified material portion and/or the material properties of the modified material portion may change from an end adjacent the designated surface and an end adjacent/attached to a full masking portion.

Figure 7:
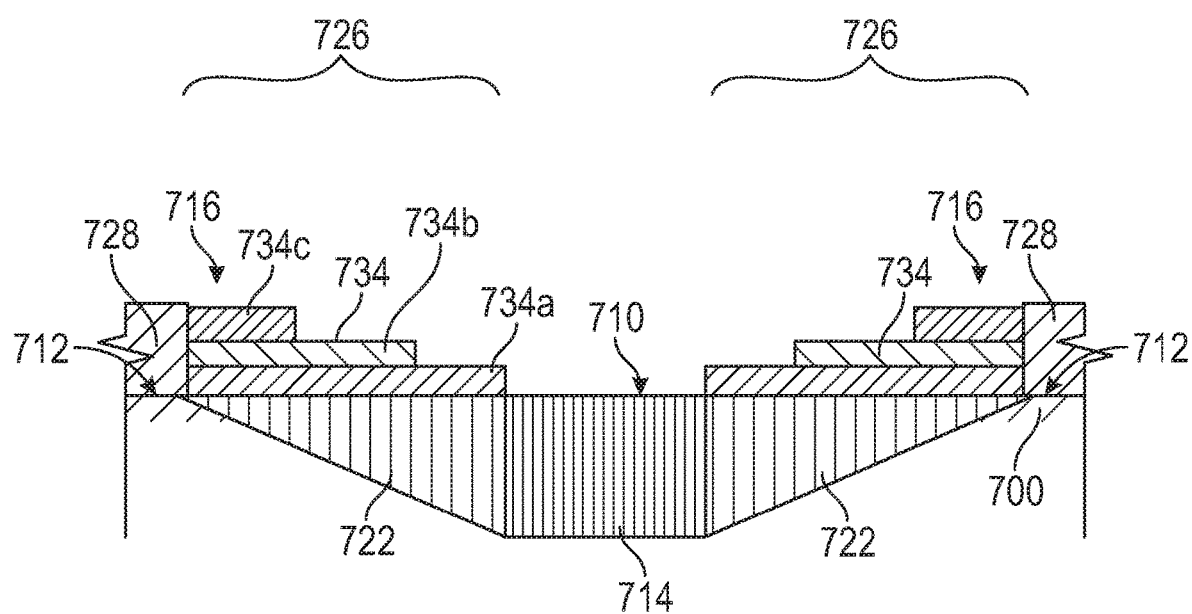
FIG. 7 is a schematic illustration of a mask in accordance with an embodiment of the present disclosure as applied to a component.

In addition to the structures and configurations shown and described above, the masking control region of some embodiments may be a composite structure, such as layers of one or more types of materials, that are configured to control a transfer of force from shot peen media into a material of a component. For example, turning now to FIG. 7, a schematic illustration of a component 700 having a mask 716 applied thereto in accordance with an embodiment of the present disclosure is shown. The component 700 has a designated surface 710 to which it is desired to have improved compressive stresses to increase part life. To achieve such increased compressive stresses, as described above, a shot peening operation may be performed wherein a stream of shot peen media are impinged upon the designated surface 710. However, surrounding the designated surface 710 may be surfaces of the component 700 that are desired to not be impinged upon by the shot peen media. Accordingly, the mask 716 is applied to the surfaces of the component 700, and particularly to protected surfaces 712 of the component 700.

To prevent sharp lines of demarcation in the compressive stresses formed in the component 700, the mask 716 includes a masking control region 726. The masking control region 726 is configured to enable the generation of a tapering transition 722 of the compressive forces that are formed in the component 700 by the shot peen media around a compressive stress region 714 defined at the designated surface 710. The masking control region 726 covers a portion of the protected surface 712 of the component 700 from a full masking portion 728 of the mask 716 and extends to the designated surface 710. The full masking portion 728 of the mask 716 may be configured to fully protect the protected surface 712 such that no impact forces of shot peen media are transferred into the material of the component 700. In this embodiment, the masking control region 726 is defined by a composite portion 734. The composite portion 734 of the mask 716 is formed of one or more layers of material 734a-c. The layers of material 734a-c may be formed from the same or different materials or materials having different properties/characteristics. The layers of material 734a-c of the composite portion 734 may be selected to provide a modified protection to the protected surface 712 that is different from that of the full masking portion 728. For example, the composite portion 734 may allow for a portion of the force of impact from shot peen media to pass through the composite portion 734 and impact and alter the properties of the material of the component 700 to generate a tapering transition 722 of the compressive forces of the material of the component 700. As shown, the different layers of material 734a-c each have a different length, extending from the full masking portion 728 toward the designated surface 710. Such arrangement is not to be limiting, but may allow for a more customized control of the forces imparted from shot peen media into the material of the component 700.

As noted above, the masking control region may be formed from a material that is the same as or different from the rest of the masking. In some embodiments, the masking control region may be formed from one or more of the following, without limitation: plastic backed masking tape; rubber backed masking tape; vinyl backed masking tape; selective layer sintering additive manufacturing material glass filled nylon; polymer additive manufacturing material; silicone rubber molded materials; and/or room temperature vulcanization material. The preceding list is merely provided for example and other materials may be employed without departing from the scope of the present disclosure. For example, a metal or alloy may be employed to form the masking control region.

Although the various above embodiments are shown as separate illustrations, those of skill in the art will appreciate that the various features can be combined, mix, and matched to form a mask or masking configuration that is enabled by one or more features described herein. Thus, the above described embodiments are not intended to be distinct arrangements and structures of a mask, but rather are provided as separate embodiments for clarity and ease of explanation. Further, the components that may benefit from such processes described herein, may include, without limitation, airfoils, platforms, blade outer air seals, panels, seals, etc. that may be part of a gas turbine engine. Moreover, although discussed and illustratively shown as related to gas turbine engine components, embodiments described herein may be applicable to other aerospace applications and/or other industries wherein components may be shot peen treated for enhancement of fatigue life or for other purposes.

Advantageously, embodiments described herein provide for a masking scheme for use in the manufacturing of components of gas turbine engines with improved control of stresses in the components. Advantageously, embodiments described herein can eliminate a sharp line of demarcation in the stresses induced in a component due to the design of the masks described herein. As noted above, the current method of avoiding a sharp line of demarcation is to provide a relatively generous area where shot peening is optional (i.e., where the overspray shot peen stream impacts the component). Under this method, the surface adjacent a designated surface is not directly shot peened, so it would only be subjected to shot peen overspray. Shot peen overspray is difficult to accurately control and quantitatively measure. As such, advantageously, embodiments of the present disclosure provide for masking that allows for better, repeatable, and more accurate control of the intensity of a fade out zone of the impact of the shot peen media to a surface of a component. Further, advantageously, embodiments described herein can include a masking control region that is 1.25 inches or less, allowing for shot peening in regions of components not previously allowed to be shot peened due to shot peen overspray.

As used herein, the term "about" is intended to include the degree of error associated with measurement of the particular quantity based upon the equipment available at the time of filing the application. For example, "about" may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described with reference to an illustrative embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodi-

What is claimed is:

1. A method for manufacturing a component of a gas turbine engine, the method comprising:
applying a mask to a surface of the component, the component having a designated surface to be treated by a shot peen operation, wherein the mask is applied to a protected surface of the component, the mask comprising a full masking portion configured to prevent a shot peen media from impacting the protected surface beneath the full masking portion;
arranging a masking control region of the mask around the designated surface, wherein the masking control region is configured to control an amount of force imparted to the component by shot peen media during the shot peen operation, wherein the masking control region extends from the full masking portion to the designated surface; and
shot peening, with the shot peen media, the designated surface with a full intensity shot peen stream to form a compressive stress region within the component proximate the designated surface and shot peening the masking control region with an overspray shot peen stream to form a tapering transition of compressive forces within the component proximate the masking control region.

2. The method of claim 1, wherein the masking control region comprises a tapering portion extending from the full masking portion to the designated surface.

3. The method of claim 2, wherein the material of the masking control region is the same as the material of the full masking portion.

4. The method of claim 2, wherein the material of the masking control region is the different from the material of the full masking portion.

5. The method of claim 1, wherein the masking control region comprises a modified material portion extending from the full masking portion to the designated surface.

6. The method of claim 5, wherein the modified material portion comprises at least one of a different material and a different material property than the full masking portion.

7. The method of claim 1, wherein the masking control region comprises a composite portion extending from the full masking portion to the designated surface.

8. The method of claim 7, wherein the composite portion comprises at least one of a different material and a different material property than the full masking portion.

9. The method of claim 7, wherein the composite portion comprises a plurality of layers of material.

10. The method of claim 9, wherein each layer of the plurality of layers of material is formed of a different material.

11. The method of claim 1, wherein the masking control region is formed from at least one of plastic backed masking tape, rubber backed masking tape, vinyl backed masking tape, selective layer sintering additive manufacturing material glass filled nylon, polymer additive manufacturing material, silicone rubber molded materials, room temperature vulcanization material, metal, and metal alloy.

12. The method of claim 1, wherein the component is an airfoil.

13. The method of claim 1, wherein the masking control region is less than 1.25 inches in a length from the full masking portion to the designated surface.

* * * * *